Oct. 4, 1949.  G. W. SWITZER  2,483,679
AUTOMATIC CHANGE-OVER FOR MOTION-PICTURE PROJECTION
Filed May 16, 1947  2 Sheets-Sheet 1

INVENTOR.
George W. Switzer
BY
Att'y

Oct. 4, 1949.  G. W. SWITZER  2,483,679
AUTOMATIC CHANGE-OVER FOR MOTION-PICTURE PROJECTION
Filed May 16, 1947  2 Sheets-Sheet 2
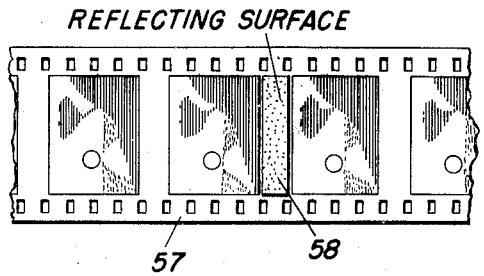
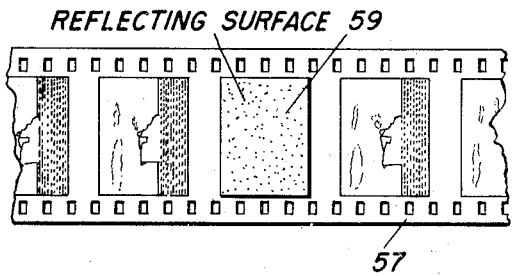
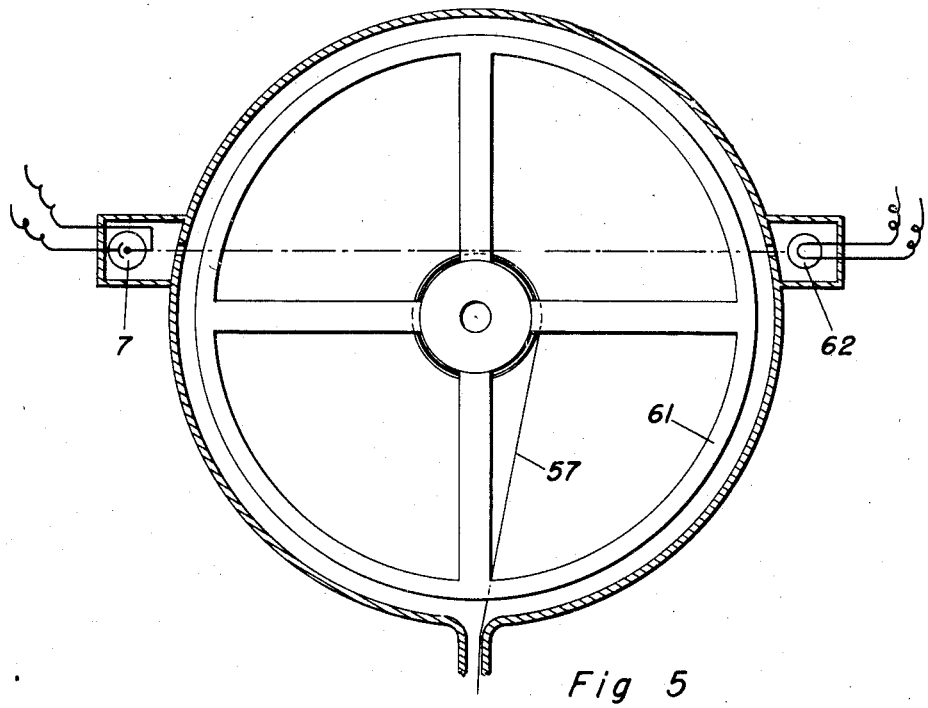
INVENTOR.
George W. Switzer
BY
Att'y Patented Oct. 4, 1949

2,483,679

UNITED STATES PATENT OFFICE 2,483,679

AUTOMATIC CHANGE-OVER FOR MOTION-PICTURE PROJECTION

George W. Switzer, Mill Valley, Calif., assignor of one-fourth to Abe Blumenfeld and one-fourth to Hal D. Neides Application May 16, 1947, Serial No. 748,535

1 Claim. (Cl. 88—17)

This invention relates to improvements in automatic change-over mechanism for motion picture projection apparatus, and has particular reference to automatic means for changing from one projection machine to another projection machine when the end of the film being projected has been reached, and to begin the projection of the second film, whereby the picture being projected upon the screen will be continuous and there will be no interruption in the viewing of the projected picture.

The principal object of this invention is to provide electrical means for accomplishing the change-over, thus eliminating the human element to a large extent.

A further object is to produce a device which may be attached to any standard form of projection machine now in general use without materially altering its construction.

A still further object is to produce a device which is economical to manufacture and install, a device which occupies a minimum amount of room in the projection booth and one which may be thrown into and out of operation at will, thereby enabling the operator to return to manual operation if he so desires.

Other objects and advantages will be apparent during the course of the following description.

In the accompanying drawings forming a part of this specification and in which like numerals are employed to designate like parts throughout the same, Fig. 1 is a diagrammatic wiring diagram of my change-over circuit.

Fig. 3 is a fragmentary section of motion picture film with a reflecting area formed thereon.

Fig. 4 is a similar view showing a different positioning of the reflecting area, and Fig. 5 is a side elevation of a film reel and casing therefor with an electric eye attached thereto.

Figure 1:
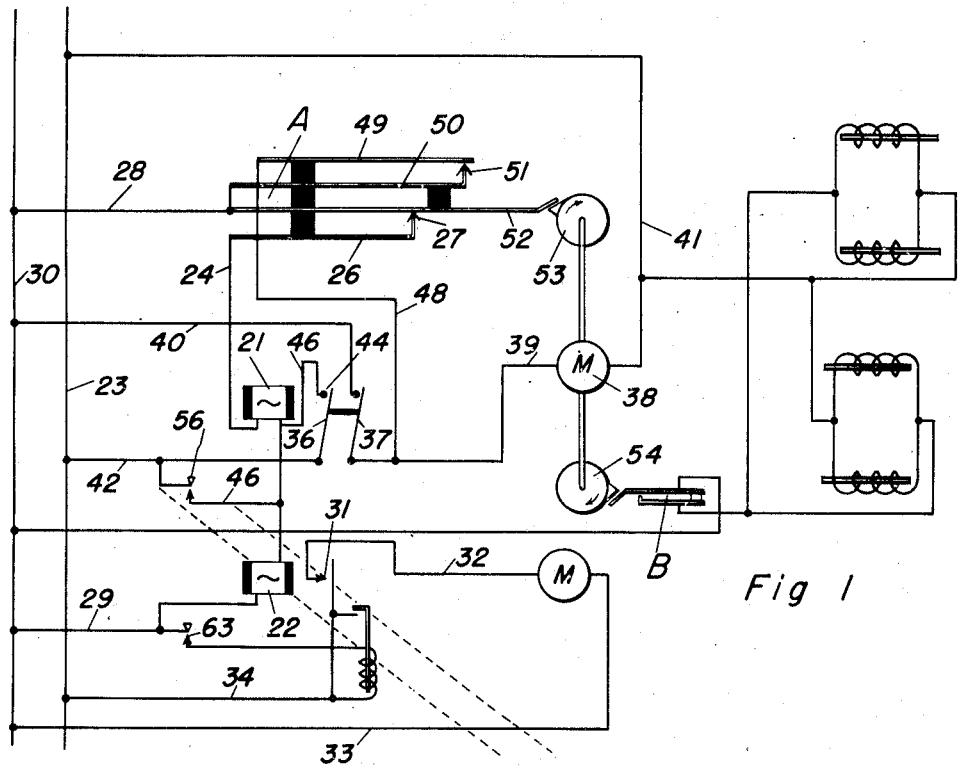

At the present time in a motion picture theatre where motion pictures are projected upon a screen it is customary to have two projection machines, one of which is in operation while the other one is being made ready, the result being that when the end of the film is reached in the machine which is in operation it has been necessary for the operator to ascertain the fact by careful observation, and to then watch the screen very attentively, and at the proper interval to stop the first machine and start the second machine.

The ordinary procedure is, as follows:

Each film as received from the film distributing house is provided with a leader on the beginning end of the film, which leader has markings on it to indicate the number of feet from the beginning of the film to the beginning of the pictures on the film which are to be projected.

Inasmuch as some machines run slower or faster in their initial starting it is necessary to thread into the machine more or less feet of leader in order to have the beginning of the film reached at the proper time that the machine has come up to speed.

Assuming that one of the projectors is in operation and that the picture is being projected upon the screen, when the film has reached a point approximately one minute from the end of the film a buzzer will sound, at which time the operator now starts to watch for a small dot projected upon the screen at the upper right hand corner thereof and approximately seven seconds before the end of the film will be reached.

As soon as the buzzer sounds the operator starts the arc in the new machine, at the same time keeping his eye upon the screen to watch for the above mentioned dot, and as soon as the dot appears he then closes a switch to start the motor on the second machine, at the same time watching the screen for a second dot which should appear in seven seconds from the time the first dot is noted. (It must be borne in mind that this dot is very small and inconspicuous in order not to be noticed by the audience and therefore requires very close attention on the part of the operator.)

As soon as the second dot appears the operator presses a button which operates a douser on the running machine, that is a device which moves a shutter in front of the line of projection so that this particular machine no longer projects on the screen, and at the same time the douser on the new machine is moved out of the line of projection.

It is also necessary to change over from the sound on the first machine to the sound on the second machine.

From the above it will be apparent that the operator must be very attentive to his work and must act with great precision and accuracy.

With my device I have overcome all of these objections inasmuch as at the end of the film the transfer from one projector to the other is automatically accomplished without the operator having to perform any physical function.

Assuming that the projector is running and the end of the film has been almost reached, either of two systems may be used to indicate a certain length of film still remaining on the reel, i. e., either a crossbeam of an electric eye or a reflecting electric eye.

Figure 2:
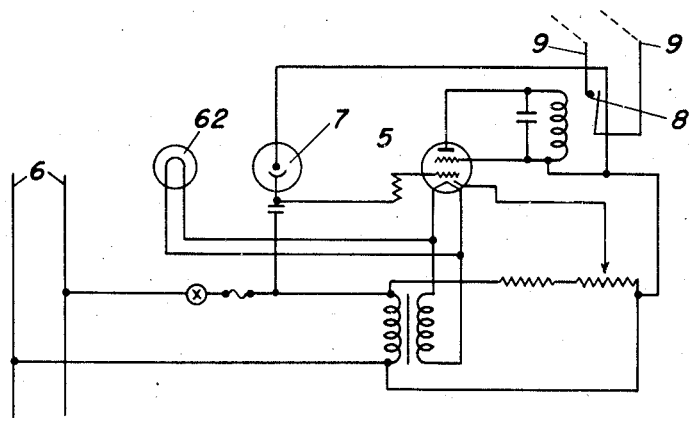
Fig. 2 is a diagrammatic wiring diagram of the end of the film indicator circuit.

This electric eye in turn will actuate a circuit in which a certain sequence of events are as follows:

Referring to Fig. 2, I have shown an ordinary electric eye circuit designated as a whole by the numeral 5, the circuit being such that when current from the wires 6 energizes the electric eye 7 current will flow through a relay and close switch 8, thence through wires 9 to wires 42 and 46, which will in turn energize the relays 21 and 22, the current flowing from the alternating current wire 23, through the relay 21, thence by wire 24 to the contacting arm 26 of a normally closed contact switch point 27; thence by wire 28 back to the other side of the line 30.

At the same time current will flow through the relay 22 and back to the other side of the line through wire 29. When the relay 22 closes the motor of the projector to be started will be energized through the closing of the relay switch contact 31, thus completing the circuit through wires 32, 33, and 34. At exactly the same time the closing of the relay 21 causes the switch arms 36 and 37 to complete other circuits, the arm 37 completing a circuit to the synchronous motor 38, current then flowing through wires 39 and 41 to one side of the alternating current line and through wires 40 to the other side of the line.

The other relay switch 36 completes a circuit through the contact 44, wire 46, thus bridging the photoelectric circuit wires 9 and holding the relay 21 closed. Current will now flow from the wire 39 through wire 48 to the top leaf 49 of switch A where the current will now stop inasmuch as this arm and its adjacent contact normally are in open position.

The second leaf 50 has a contact 51 and is connected to the wire 28 and to the leaf 52 of the switch. This leaf 52 has an insulating pusher underlying the leaf 51 and has its extremity in alignment with the periphery of a rotating disc 53 driven by the motor 38, which disc has a projection thereon adapted to engage the end of the leaf 52 and raise the same, which will then break contact with the contact 27.

As the motor 38 revolves it would also rotate a disc 54 also having a projection on its periphery and adapted to engage a leaf of a normally opened switch B, which when closed will energize the douser and sound mechanism on one projector and release the douser and sound on the other projector.

At 56 I have shown a manual switch by which the above operation can be started; however, this switch is not used when the electric eye is connected thereto.

Referring now to Figs. 3, 4 and 5, it will be noted that the film strip 57 has a reflecting surface 58 formed between two of the pictures on the film, or in the form shown in Fig. 4. The film strip 57 has a reflecting surface 59 occupying the space usually occupied by one of the pictures.

In Fig. 5 I have shown the film 57 leading from the reel 61, and at 7 I have shown an electric eye and at 62 a light source. With this arrangement, when the film on the reel has been unwound therefrom down to a point adjacent the hub, it will permit a beam of light to cross the reel to affect the electric eye 7, which in turn will energize the relay to actuate the switch 8 and to in turn close the circuit across the switch 56, thus setting into motion the change over mechanism.

By using film with reflecting surfaces, as shown in Figs. 3 and 4 the electric eye and light source may be moved to the dotted line positions of Fig. 5, whereby the reflection of the reflecting surface will actuate the eye to accomplish the change-over operation.

The arrangement is such that as soon as the mechanism starts to operate the synchronous motor 38 rotating at a definite speed will start the projector motor, and at the end of seven seconds will operate the douser and sound change-over and will reset itself ready for the next operation, as when the projection on the disc 53 raises the leaf 52, the circuit will be broken through the contact 27, thus disconnecting the relay 21 which will break the circuit to the motor 38. The switch contact 31, however, will remain closed until the operator closes the switch 63 to actuate a trip when it is desired to stop the motor of the projector.

By adding additional discs to the shaft of the motor 38 the mechanism can be caused to also operate the opening and closing of the stage curtains, turning on and off the stage lights or house lights, all timed to the change over of one projecting machine to another.

It is to be understood the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a device of the kind described, a pair of conductors forming a source of current, a relay magnet having one terminal connected to one of said conductors, a circuit closer having one terminal connected to the other conductor and its other terminal connected to the remaining terminal of said magnet, a motor having one terminal connected to one of said conductors and its other terminal connected to a relay contact, an armature for said magnet cooperating with said contact, and connected to the other conductor, a second relay magnet having one terminal connected through said circuit closer with one of said conductors and its other terminal connected to a contact point, a spring contact normally closed on said contact point and connected to the other conductor, a second motor synchronous with the first motor, a second relay contact having connection with one of said conductors through said circuit closer, an armature coacting with the last mentioned contact point and connected directly to the last mentioned conductor, a third contact point connected to one of said conductors, a second armature for said second magnet and connected to one terminal of the second motor, said second motor having its other terminal connected to the other conductor, a second spring contact connected to one of said conductors, a fixed contact normally open from the second spring contact and connected to the first terminal connection of the second motor, a normally open circuit closer having one terminal connected to one of said conductors, a pair of translating devices reversely connected in multiple to the second terminal of said last circuit closer, said translating devices being reversely connected in multiple to the other conductor, means operated by the second motor for breaking contact between the first spring contact and its fixed contact and for closing the last open circuit closer, and an electric eye controlled circuit for bridging the terminals of the first mentioned circuit closer.

GEORGE W. SWITZER.

REFERENCES CITED

The following references are of record in the file of this patent:

UNITED STATES PATENTS

| Number | Name | Date |
| --- | --- | --- |
| 1,547,144 | Jensen | July 21, 1925 |
| 1,888,276 | Loehr, Jr., et al. | Nov. 22, 1932 |
| 1,972,904 | Pritchard | Sept. 11, 1934 |
| 1,980,167 | Crabtree | Nov. 13, 1934 |
| 1,988,255 | Soons | Jan. 15, 1935 |
| 2,213,664 | Berg | Sept. 3, 1940 |